March 2, 1971     G. W. McELROY     3,567,470
MILK STERILIZATION PROCESS
Filed June 24, 1968
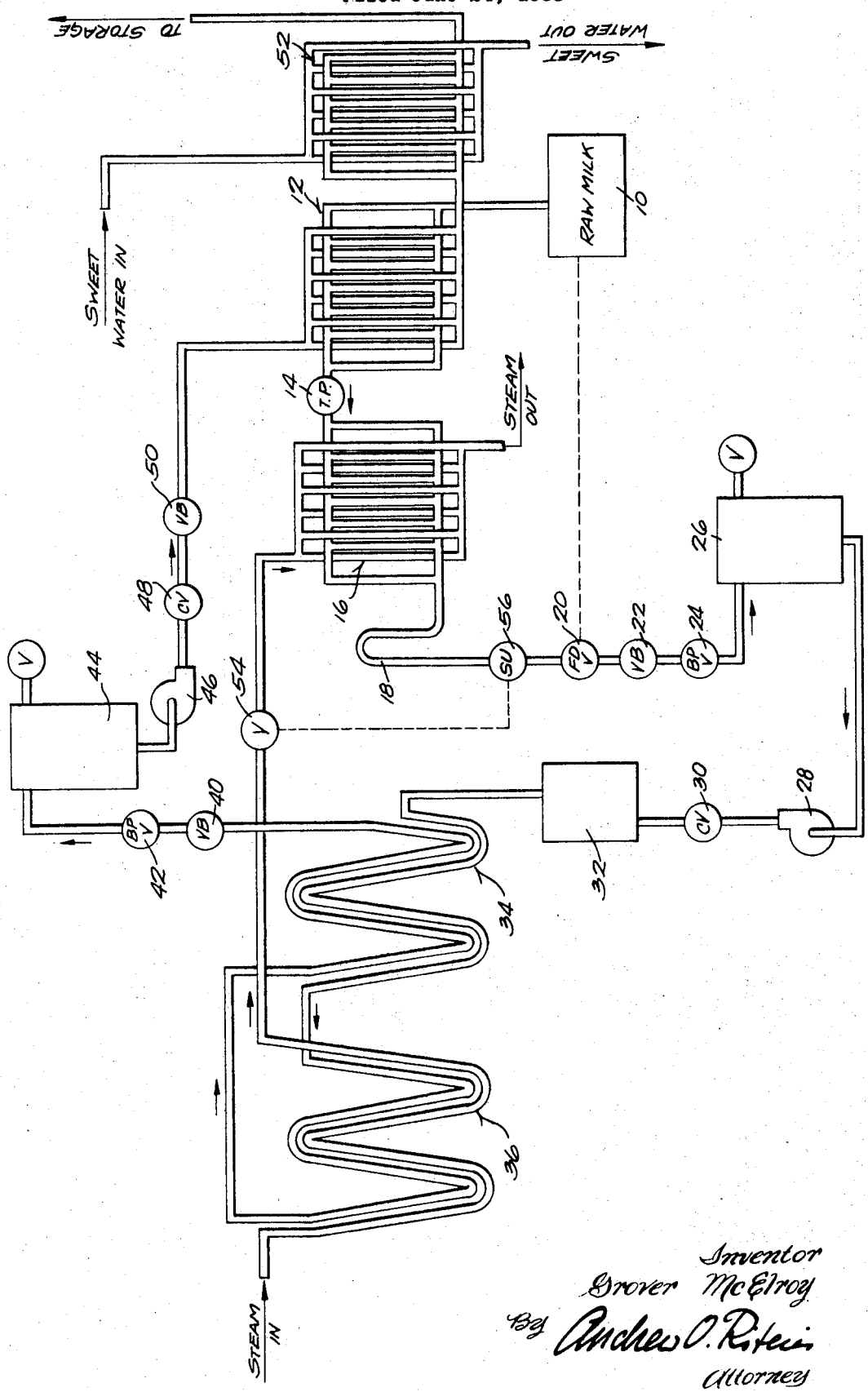
Inventor
Grover McElroy
By Andrew O. Riteris
Attorney

United States Patent Office

3,567,470
Patented Mar. 2, 1971

3,567,470
MILK STERILIZATION PROCESS
Grover W. McElroy, 1587 Cherry Road, Apt. 1,
Memphis, Tenn. 38117
Filed June 24, 1968, Ser. No. 739,413
Int. Cl. *A23c 3/02*
U.S. Cl. 99—212      7 Claims

ABSTRACT OF THE DISCLOSURE

A single flow high temperature and short time milk sterilization process in which raw milk is first treated in standard presses of the type normally used for pasteurization and thereafter is passed through counterflow heat exchangers wherein the milk is gradually raised to sterilization temperatures. The milk is vacuum treated after pasteurization and after sterilization and is maintained under pressure while it is passed through the sterilization heat exchangers.

BACKGROUND OF INVENTION

The field of invention may be defined as the sterilization and pasteurization of milk and similar food products.

The dairy industry has actively sought an effective and efficient milk sterilization process for over several decades. The need for an effective sterilization process has been increasing with the increasing health and sanitation standards with which the dairy industry must comply. Also, effective sterilization of milk diminishes and possibly even eliminates the requirement for refrigeration of milk in storage and transport. The possibility of eliminating refrigeration has gained great promise with the development of modern milk packaging techniques which can be employed in packaging milk or similar liquid products under sterile conditions at production line speeds.

The principal drawback to the production of sterilized milk for the general consumer public has been the inability to eliminate a "cooked" or burnt flavor of the product if the milk is heated to sterilization temperatures. Many attempts have been made to overcome this difficulty; however, the prior art attempts have only been somewhat successful with rather cumbersome processes which do not readily lend themselves to adaptation to the standard milk processing methods which are presently used. The prior art has suggested batch sterilization techniques which require the treatment of separate batches of milk and thus do not lend themselves to incorporation in a continuous flow system. Poggioli et al. 2,990,288, issued on June 27, 1961, discloses a typical batch sterilization technique. In continuous flow systems, a steam injection sterilization has been proposed. In such sterilization, heated milk is mixed with steam and raised to a sterilization temperature and thereafter the steam is removed from the product in a flash chamber. Stewart 3,230,095, issued on Jan. 18, 1966, discloses a typical steam injection sterilization method. Although this method is suggested for a continuous flow system, the addition and removal of the steam requires rather complicated equipment and fairly closely controlled operating conditions. The latter technique is presently believed not to be suitable for the treatment of milk which is intended for sale to the general consumer public.

SUMMARY OF INVENTION

The present invention resides in the sterilization of milk in a continuous flow process wherein the milk is first passed through the standard presses which are required for pasteurization and, thereafter, is passed through further heat exchangers in which the temperature is gradually raised to sterilization levels. The burnt flavor is eliminated by vacuum treating the milk before and after it passes through the heat exchangers and by controlling the flow through the heat exchangers so as to obtain a high product velocity and a low heat differential between the milk and the heating medium of the heat exchanger. The vacuum treatment removes air and other gases from the milk and the controlled flow is believed to avoid flashing of the processed milk as well as baking on of the milk solids to the sidewalls of the heat exchanger conduits. The milk is maintained under some back pressure while it passes through the sterilization heat exchangers in order to avoid boiling and flashing.

DESCRIPTION OF DRAWING

The drawing is a schematic illustration of the present sterilization process.

The sterilization process embodying the present invention may be defined as a through-flow process in that the milk is in continuous flow from the raw milk supply to the storage facilities of the sterilized milk.

The first phase of the sterilization process may be defined as the pasteurization phase during which raw milk is raised to pasteurization temperatures in the known manner. This phase of the process may be performed with standard equipment. The starting point of the process is the raw milk supply 10 which generally is at a temperature of 35° to 45° F. The milk is pumped through a first regenerator press 12, which is well known in the art, and which essentially provides multiple parallel product passages which are separated by similar passages for counterflow of the heating medium. In the present case the heating medium is counterflowing sterilized milk which enters the regenerator at approximately 190° F. and leaves the regenerator at approximately 110° F. In the first regenerator press the raw milk is raised to a temperature between 130° and 160° F. The raw milk is pumped through the first regenerator press by a timing pump 14 of known design.

The milk is then pumped, by the timing pump 14, through a first heater 16 wherein its temperature is raised to a pasteurizing temperature, which under present-day standards has to be between 161.5° F. and 190° F. The heater 16 is identical in function to the first regenerator press in that it provides a plurality of parallel product passages which are separated by heating medium passages. In the heater 16, the milk is raised to the pasteurization temperature by counterflowing hot water or steam.

As the milk leaves the heater 16, it is passed through a suitable holding tube 18. A holding tube of this type is required for pasteurization which in essence requires that the milk pass at the pasteurization temperature through a tube of predetermined inside diameter and length so as to assure that the pasteurization temperature is maintained for a prescribed time period. In most cases the holding tube is so dimensioned as to assure that a sixteen second time span is required for product passage through the tube.

After leaving the holding tube, the milk passes through a flow diversion valve 20. This valve is well known in the pasteurization art. It is a normally open temperature sensitive valve which permits the product to flow to the next following piece of equipment if the product temperature at the valve is at the requisite pasteurization temperature. The valve blocks such flow and diverts the product to the raw milk supply in the event that the product temperature falls below the minimum.

Thereafter the milk passes through a vacuum breaker 22 and a back pressure valve 24 to a vacuum chamber 26. The vacuum breaker is a standard component of a through-flow pasteurization system. It functions to provide an air vent to the vacuum chamber in the event that the line pressure at the vacuum breaker falls below a predetermined minimum. This feature assures that the vacuum within the vacuum tank will not cause objectionable product to be drawn past the flow diversion valve 20.

The back pressure valve 24 maintains the milk in the heater 16 under a predetermined pressure. The back pressure is in the range of 25 to 45 pounds per square inch gauge and, preferably, about 30 pounds per square inch. This back pressure permits the milk to be heated to the pasteurizing temperatures within heater 16 without causing boiling or flashing of the product. At this point it should be noted that an increase in the amount of back pressure will not have an adverse effect on the milk as such and that it might be preferable to provide sufficient back pressure so that the pressure on the product side of the heater is in excess of the pressure of the heating medium.

The vacuum tank 26 functions to remove air and volatile gases from the pasteurized milk. This step is important in that the air and the entrapped volatile gases are a definite contributing factor to the objectionable burnt flavor which is usually associated with milk which has been heated to sterilizing temperatures. Also, it is believed that entrapped air and gases do contribute to boiling and flashing at such temperatures. The air and gases are removed by providing a 6 to 13 inch vacuum within the vacuum tank. Since it is desirable to remove as much air and gases as possible, the maximum permissible vacuum should be utilized, and in view of this, the vacuum should be regulated to a level just below that at which the product would boil within the tank. In an efficient process, the milk will enter the vacuum tank at a temperature almost equal to the pasteurization temperature. In such a case a vacuum of 12 inches has been found to be satisfactory.

The milk is removed from the vacuum chamber by a centrifugal pump 28 at substantially the same rate as the rate of incoming milk to the tank. As the milk leaves the vacuum chamber, its temperature has dropped between 5° to 15° F. The milk is then passed through a normally open check valve 30 to a homogenizer 32. The check valve has no effect upon the sterilization process as such and merely serves to eliminate the possibility of a reverse flow at times of start-up of the equipment.

The homogenizer 32 is of standard design and serves as a pump to further pump the product through a second regenerator press 34 and heater 36. The milk enters the second regenerator press at a temperature of 160° to 180° F. The regenerator press is similar to the press 12, except that it employs a single continuous product passage which is adjacent to a similar single and continuous heating medium passage. In other words the regenerator press 12 may be defined as a parallel flow heat exchanger whereas the regenerator press 36 may be defined as a series type heat exchanger.

The reasons for providing a series type press at this point are twofold. First, a series flow of the type described permits a significantly more gradual rise in temperature of the product than would be the case with a parallel flow as employed in regenerator press 12. This feature is believed to avoid the boiling and flashing tendency which is present if the milk is subjected to sudden contact with a surface of significantly higher temperature. In the illustrated embodiment, the milk entering the second regenerator press is only about 20° to 40° F. below the temperature of the heating medium which it encounters at that point. As the milk is passed through the regenerator press 34, its temperature is raised to a range between 240° and 260° F. However, due to the use of a series type flow, the temperature differential between the heating medium and the milk is maintained in the relatively low differential of 20° to 40° F.

The second advantage of employing a series type regenerator press is that the product velocity through the press is significantly faster than would be the case if the press were changed to a parallel flow. In the illustrated embodiment the product velocity through the regenerator press 34 is about three times greater than the velocity through regenerator press 12. The increase in velocity tends to diminish the accumulation or backing on of solid matters to the sidewalls of the press and, therefore, diminish the possibility of affecting the flavor of the processed milk.

After leaving the regenerator press 34, the milk is passed through the heater 36. The heater is also a series type heat exchanger and in essence differs from the regenerator press 34 only by the fact that the heating mechanism used is steam and not sterilized milk. At this stage the milk is raised to a sterilization temperature of 270° to 280° F. by counterflowing saturated steam which enters the heater at a temperature of approximately 300° F. and at a pressure of approximately 20 pounds per square inch gauge. At the steam exit side of the heater the steam temperature has dropped to about 200° F. Wet steam is thought to be preferable over superheated steam in that the latter has a tendency to provide uneven surface temperatures on the plates of the press and to thus contribute to possible flashing problems.

After the milk has passed through the heater 36, it is recirculated through the heating medium side of the regenerator press 34 wherein it raises the temperature of the counterflowing unsterilized milk, as described heretofore. The sterilized milk enters the regenerator 34 at the sterilization temperature and its temperature is reduced to approximately 200° F. as it leaves the regenerator.

Thereafter the sterilized milk is passed through a vacuum breaker 40, a back pressure valve 42, which maintains a back pressure of approximately 40 pounds per square inch gauge, to a second vacuum tank 44. A vacuum of approximately 5 to 6 inches is maintained in the vacuum tank, and again air and volatile gases are removed.

The sterilized milk is removed from the vacuum tank by a centrifugal pump 46 and then passes through a normally open check valve 48 and a vacuum breaker 50 to the regenerator press 12 where it counterflows with the unsterilized milk as explained heretofore. Thereafter it passes to a heat exchanger 52 where it is cooled by counterflowing sweet water to a temperature of approximately 40° F. Thereafter the sterilized milk passes to an aseptic storage or packaging facility.

The existing steam from the heater 36 passes to a mixing valve 54 at which it is mixed with water to provide a heating medium of appropriate temperature for the heater 16. The proportion of steam-water mix may be controlled by a sensing unit 56 which senses the product temperature at the holding tube 18.

Although but a single embodiment of the present invention has been illustrated and described, it will be apparent to those skilled in the art that various changes and modifications may be made therein without departing from the spirit of the invention or from the scope of the appended claims.

I claim:

1. A continuous-flow process for sterilizing milk comprising the steps of:
heating milk to a pasteurizing temperature,
thereafter passing such milk through a first vacuum chamber wherein said milk, while being at an elevated temperature, is subjected to a first vacuum which is sufficient to remove gaseous materials from said milk without causing said milk to boil,
thereafter passing said milk through heat exchanger means comprising a single and continuous heating medium passage adjacent a single continuous product passage in which a difference between the milk and heating medium at a particular point of reference is between 20° and 40° F. wherein the milk, while being maintained under a back pressure of at least 30 pounds per square inch gauge, is raised to a sterilization temperature, and thereafter cooling said milk under sterile conditions.

2. The process according to claim 1 wherein after the milk has been sterilized, the milk is subjected to a second vacuum chamber having a vacuum sufficient to remove gaseous materials added by the sterilization process without causing said milk to boil.

3. A process according to claim 2 wherein said milk which has attained said sterilization temperature is first cooled to a temperature intermediate the sterilization and pasteurization temperatures before it is passed through said second vacuum chamber.

4. The process according to claim 3 wherein
said heat exchanger means is partially regenerative with the heating medium being sterilized milk cooled by the unsterilized milk entering the heat exchanger;
said vacuum in said first vacuum chamber being 6 to 12 inches; and
said vacuum in said second vacuum chamber being 5 to 6 inches.

5. A continuous-flow process for sterilizing milk comprising the steps of:
heating the milk to a pasteurization temperature,
then subjecting such milk while it is at approximately said pasteurization temperature to a first vacuum of 6 to 12 inches,
then raising the temperature of said milk to a temperature between 260° and 280° F. while maintaining said milk under a pressure of 30 to 40 p.s.i. by passing said milk through heat exchanger means comprising a single and continuous heating medium passage adjacent a single continuous product passage,
then cooling said milk to a temperature between 150- and 250° F.,
then subjecting said milk to a second vacuum of 5 to 6 inches, and
then cooling said milk to storage temperature.

6. A process according to claim 5 wherein
the difference between the milk and heating medium at a particular point of reference is between 20° and 40° F.,
said milk is homogenized after it has been subjected to said first vacuum and before it is raised to the temperature between 260° and 280° F.

7. The process according to claim 6 wherein said heat exchanger means is partially regenerative with the heating medium being sterilized by milk cooled by the unsterilized milk entering the heat exchanger.

References Cited

UNITED STATES PATENTS

| | | | |
|---|---|---|---|
| 1,872,795 | 8/1932 | North | 99—212 |
| 2,236,087 | 3/1941 | Detwiler | 99—212X |
| 2,522,796 | 9/1950 | Olson et al. | 99—212X |
| 2,772,979 | 12/1956 | Graves | 99—212X |
| 2,849,931 | 9/1958 | Soderlund | 99—212 |
| 3,054,684 | 9/1962 | Smith | 99—212X |
| 3,230,095 | 1/1966 | Stewart, Jr. | 99—217 |

TIM R. MILES, Primary Examiner

U.S. Cl. X.R.

99—252